(12) United States Patent
Sakaki et al.

(10) Patent No.: US 6,364,422 B1
(45) Date of Patent: Apr. 2, 2002

(54) BALANCE WEIGHT FOR VEHICLE WHEEL

(75) Inventors: Toshiaki Sakaki, Kakogawa; Kazuo Kadomaru, Kobe; Tetsuo Mizoguchi, Nishinomiya, all of (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/640,790

(22) Filed: Aug. 18, 2000

(30) Foreign Application Priority Data

Aug. 20, 1999 (JP) .......................................... 11-234419

(51) Int. Cl.7 ................................................ B60B 7/06
(52) U.S. Cl. ...................................................... 301/5.21
(58) Field of Search .......................... 301/5.21; 428/99; 524/439, 440; 523/136, 137; 250/515, 516, 517, 518, 519

(56) References Cited

U.S. PATENT DOCUMENTS

| 4,078,422 A | 3/1978 | Brunsch et al. |
| 4,109,549 A | 8/1978 | Vincent |

FOREIGN PATENT DOCUMENTS

| EP | 0175846 | 6/1985 |
| EP | 0175846 A2 * | 4/1986 |
| GB | 2119063 | 4/1921 |
| JP | 52140556 A * | 2/1978 |
| JP | 403215563 A * | 9/1991 |
| JP | 2000154256 A * | 6/2000 |

OTHER PUBLICATIONS

European Search Report; EP 00 11 7317.

* cited by examiner

*Primary Examiner*—Russell D. Stormer
*Assistant Examiner*—Frantz F. Jules
(74) *Attorney, Agent, or Firm*—Birch, Stewart, Kolasch & Birch, LLP

(57) ABSTRACT

The present invention relates to a balance weight 10 for a vehicle wheel, including: (1) a metal clip 14 with a hook portion 11 having a cross-sectional shape corresponding to a flange edge portion of a wheel, and a leg portion 13 for retaining a weight made of a resin composition having high specific gravity, which is capable of independently close-contacting and fixing to the flange edge portion, and (2) a weight 12 made of a thermoplastic resin in including 2.5 to 8.0% by weight of a thermoplastic elastomer and 97.5 to 92% by weight of tungsten powder, which is attached to the leg portion 13.

7 Claims, 5 Drawing Sheets

BALANCE WEIGHT FOR VEHICLE WHEEL

BACKGROUND OF THE INVENTION

The present invention relates to a lead-free balance weight, which is used for controlling weight balance of a vehicle wheel in automobiles and motorcycles.

In case where well weight balance (wheel balance) of a vehicle wheel in automobiles and motorcycles is not attained, abnormal vibration of the wheel is caused by high-speed rotation of tires on running of the vehicle. This vibration is transferred to a steering to impair the comfortability on driving, or exerts an adverse influence on performances of automobiles as a result of the occurrence of an abnormal abrasion of tires. Accordingly, it is very important to control the wheel balance.

A method of mounting and fixing a balance weight to a light point of the wheel balance is employed to attain well wheel balance. The balance weight is requested to have enough small size to cause no impairment of the appearance of the wheel and to have enough flexibility to deform easily corresponding to the rim diameter of the wheel and the shape of a flange.

Therefore, there has widely been used a balance weight made of lead, which can realize size reduction because of its high specific gravity, and has proper flexibility.

However, it is notorious that lead has toxicity to the human body. Therefore, it has been a problem to use lead from an environmental point of view.

On the other hand, it has been suggested to use a balance weight made of iron in place of the balance weight made of lead. However, the balance weight made of iron had such a drawback that the volume becomes larger by about 1.44 times to obtain a balance weight having the same weight because the specific gravity (7.86) of iron is considerably smaller than the specific gravity (11.35) of lead.

The balance weight made of lead can be easily deformed, but it is very difficult to appropriately change the shape of the balance weight made of iron on attachment because iron is very hard. Accordingly, there arises a problem that the balance weight can not be firmly fixed to the wheel.

Recently, a wheel made of aluminum has frequently been used. However, the wheel made of aluminum itself is liable to be scratched by the balance wheel made of iron when some impact is applied to the wheel because the hardness of iron is higher than that of aluminum.

SUMMARY OF THE INVENTION

An object of the present invention is to provide a balance weight for vehicle wheel, which can be securely fixed to the wheel without using lead.

The present inventors have intensively studied to solve the above problems and found out such a novel fact that a balance weight having high specific gravity and proper flexibility can be obtained when using:

(1) as a clip 14 a metal member (see FIGS. 1 and 2) comprising:
a hook portion 11 formed corresponding to the shape of a flange edge portion 34 of a wheel, particularly the thickness of the flange edge portion 34, the hook portion serving as a hook for hanging on the flange edge portion, and
a leg portion 13 capable of retaining a weight used for controlling the weight of the balance weight, easily and securely, wherein the shape is controlled to enable the clip to be close-contacted independently and fixed firmly to the flange edge portion 34 and a distance 11a of the of the hook portion is formed corresponding to the thickness of the flange edge portion 34; and when providing:

(2) the leg portion 13 of the clip 14 with a weight 12 made of a thermoplastic resin (see FIGS. 1 and 2) containing a predetermined amount of tungsten powder, in a balance weight comprising a metal clip and a weight attached to the clip. Thus, the present invention has been completed.

That is, the balance weight for vehicle wheel according to the present invention comprises:

a metal clip comprising a hook portion having a cross-sectional shape corresponding to a flange edge portion of a wheel, and a leg portion for retaining a weight, which is capable of independently close-contacting and fixing to the flange edge portion, and a weight made of a thermoplastic resin comprising 2.5 to 8.0% by weight of a thermoplastic elastomer and 97.5 to 92% by weight of tungsten powder, which is attached to the leg portion of the metal clip.

According to the balance weight for vehicle wheel according to the present invention, there can be obtained the following merits:

(a) There is no fear of burden to the environment such as human body because lead having toxicity to the human body is not used (lead-free);

(b) Since a leg portion of a metal clip is provided with a weight made of a resin composition having very high specific gravity equivalent to that of lead, specifically 11.5 g/cm$^3$, the total weight can be increased while maintaining the size of a balance weight;

(c) A weight portion can be molded by injection molding because the material thereof is a thermoplastic resin composition and, moreover, the moldability is good and the weight portion can be reused;

(d) Since a weight portion is made of the resin composition in place of lead, the flange of the wheel is not scratched when the balance weight is assembled (mounted) to a steel wheel or an aluminum wheel;

(e) The weight portion can be easily cut because it is made of the resin composition so that fine control of the weight can be easily realized;

(f) Sufficient durability can be obtained in general use, as is apparent from the Examples described below, though the weight portion is made of the resin composition;

(g) Since the balance weight is a clip type one similar to a conventional balance weight, it is easily assembled or removes off and is superior in handling; and (h) The metal clip can be independently close-contacted to the flange edge portion (without interposing the resin thereby making it possible to firmly fix to the wheel (improvement in retention) and, furthermore, the balance weight can be securely fixed and deviation can be sufficiently prevented, thereby making it possible to retain well balance of the vehicle tire for a long period.

EXPLANATIONS OF LETTERS OR NUMERALS

10: BALANCE WEIGHT
11: HOOK PORTION
12: WEIGHT
13,15,16: LEG PORTION
14: METAL CLIP
34: FLANGE EDGE PORTION

MODE FOR CARRYING OUT THE INVENTION

Figure 1A:
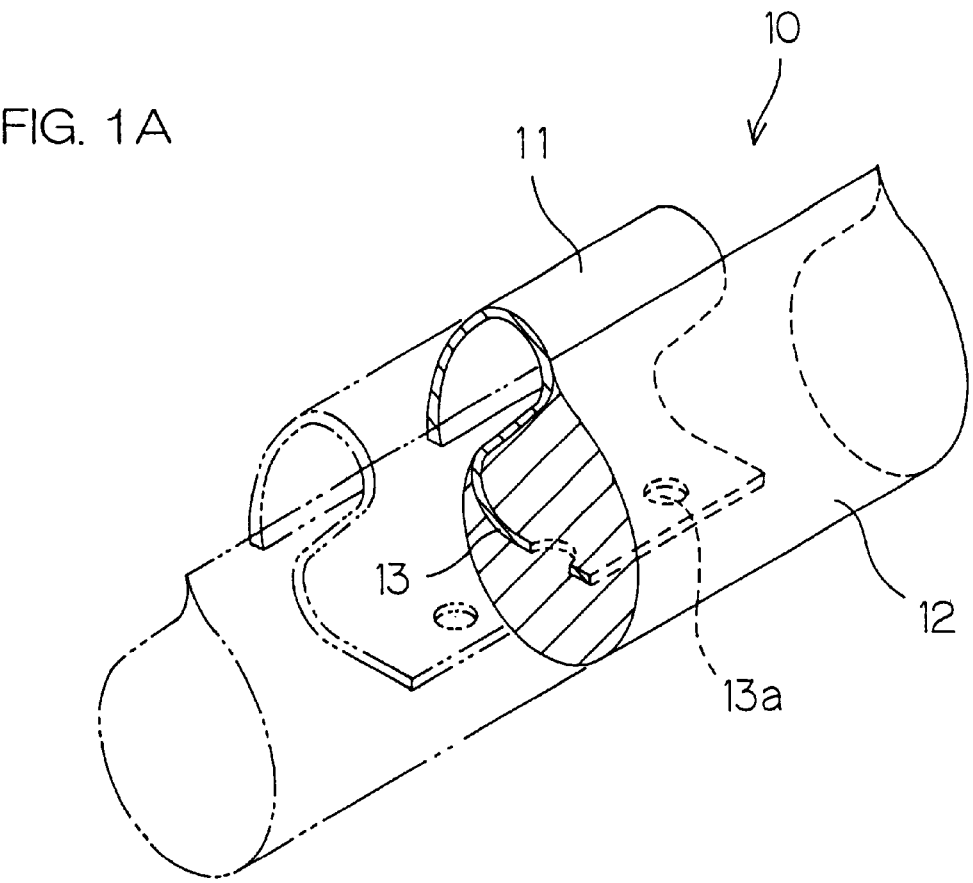
FIG. 1A is a perspective view showing one embodiment of the balance weight according to the present invention.
Figure 1B:
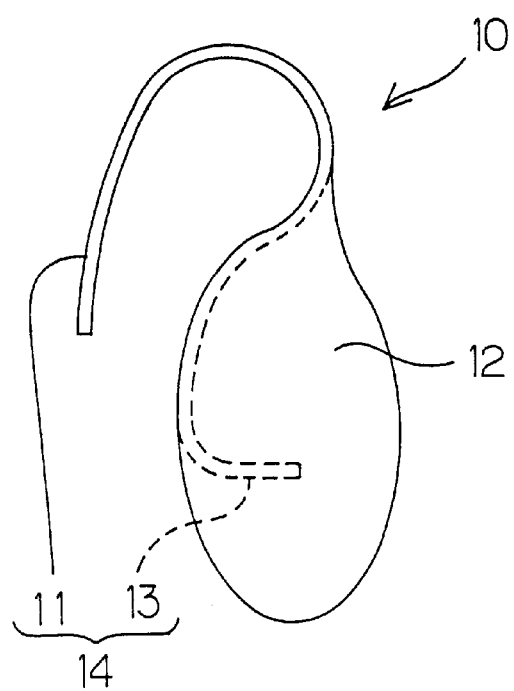
FIG. 1B is a side view thereof.
Figure 2A:
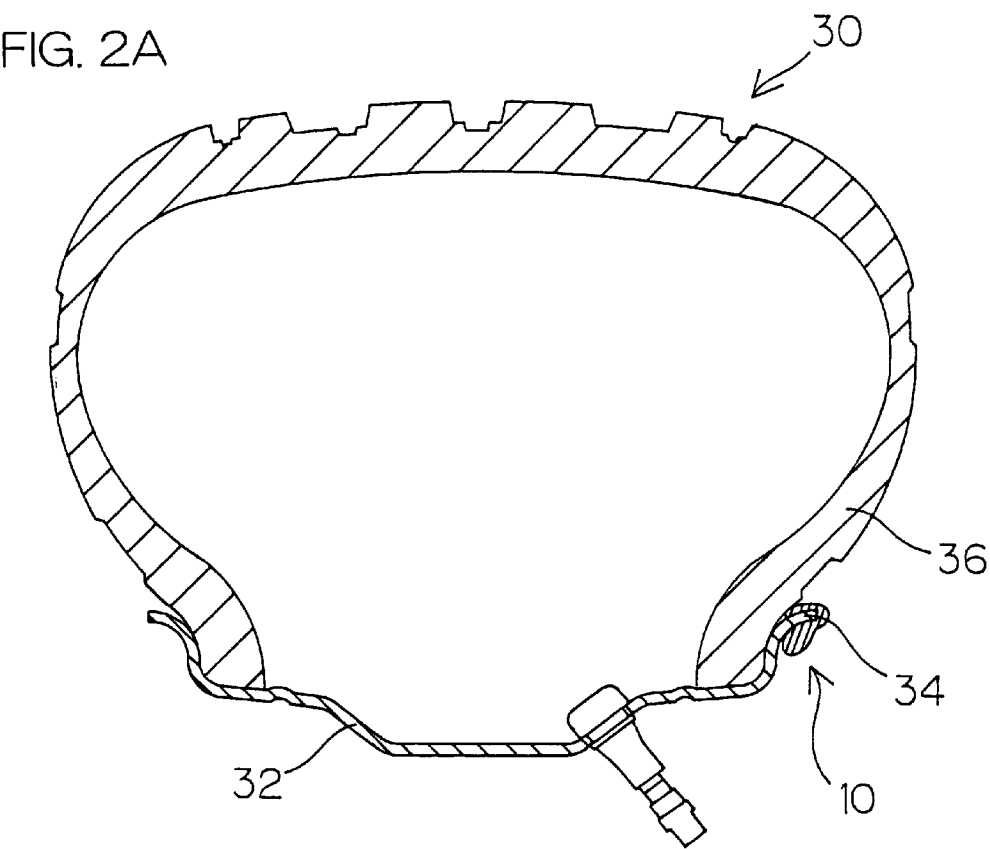
FIG. 2A is a schematic diagram for explaining the state of the balance weight according to the present invention in service.

The balance weight 10 for vehicle wheel according to the present invention is used, for example, by attaching to a flange edge portion 34 of a rim 32 in a vehicle tire 30 as shown in FIGS. 1 and 2, and comprises:

(1) a metal clip 14 comprising a hook portion 11 having a cross-sectional shape corresponding to a flange edge portion 34 of a wheel, and a leg portion 13 for retaining a weight, which is capable of independently close-contacting and fixing to the flange edge portion, and (2) a weight 12 made of a thermoplastic resin comprising 2.5 to 8.0% by weight of a thermoplastic elastomer and 97.5 to 92% by weight of tungsten powder, which is attached to the leg portion 13 of the metal clip 14, as described above.

In FIG. 2, the numerical reference 36 denotes a rubber layer 36 of the vehicle tire 30.

The respective portions of the balance weight of the vehicle wheel according to the present invention will now be described with reference to the accompanying drawings.

(Weight)

As the weight 12 of the balance weight 10 according to the present invention, a thermoplastic resin composition containing a thermoplastic elastomer and tungsten powder is used.

(Thermoplastic Elastomer)

The thermoplastic elastomer is a polymer material comprising an elastic rubber component (soft segment) and a molecular constraint component (hard segment) for preventing plastic deformation at about ordinary temperature, wherein a molecular motion of the soft segment is locally constricted by the hard segment and acts as a rubber elastic body, but exhibits plastic deformation with the increase of the temperature. Accordingly, it retains the shape and easily is deformed at ordinary temperature, while it is plasticized at high temperature, thus making it possible to be formed.

Specific examples of the thermoplastic elastomer include styrenic thermoplastic elastomer wherein the hard segment is polystyrene and the soft segment is (hydrogenated) polybutadiene, (hydrogenated) polyisoprene or polyisobutylene; olefinic thermoplastic elastomer wherein the hard segment is polyethylene or polypropylene and the soft segment is an ethylene-propylene-diene copolymer (EPDM) or a butyl rubber; polyester thermoplastic elastomer wherein the hard segment is polyester and the soft segment is polyether or an aliphatic polyester; urethane thermoplastic elastomer wherein the hard segment is an urethane structure and the soft segment is polyether or polyester; and polyamide thermoplastic elastomer wherein the hard segment is polyamide and the soft segment is polyether or polyester.

There can also be used 1,2-butadiene thermoplastic elastomer wherein the hard segment is syndiotactic 1,2-polybutadiene and the soft segment is amorphous polybutadiene; trans 1,4-polyisoprene thermoplastic elastomer wherein the hard segment is trans 1,4-polyisoprene and the soft segment is amorphous polyisoprene; ionomer wherein the hard segment is a metal carboxylate ion cluster and the soft segment is amorphous polyethylene; PE/EEA and EVA thermoplastic elastomer wherein the hard segment is a crystalline polyethylene and the soft segment is an ethylene-ethyl acrylate copolymer or an ethylene-vinyl acetate copolymer; and fluorine thermoplastic elastomer wherein the hard segment is a fluororesin and the soft segment is a fluorinated rubber.

It is necessary that the thermoplastic elastomer used in the present invention is superior in weathering resistance and aging resistance considering that the balance weight is exclusively used in the state of being externally exposed. Furthermore, considering that the temperature of the wheel of vehicles rises to about 100° C., there is required the heat resistance enough to prevent melting, softening and plastic deformation from occurring at the temperature of about 100° C.

To satisfy these requirements, the thermoplastic elastomer to be used preferably has no double bond and causes no hydrolysis reaction. Specifically, a saturated hydrogenated styrenic thermoplastic elastomer (SEPS, SEBS) is preferable, which is prepared by hydrogenating a polyisoprene or polybutadiene moiety constituting an intermediate soft segment. The styrene-isobutylene-styrene triblock copolymer (SIBS) is markedly superior in weathering resistance because it is free from a double bond in the molecule and, therefore, it is used particularly preferably in the present invention. A hydrogenated material of a styrenic thermoplastic elastomer containing a butadiene unit in the intermediate isoprene moiety can also be used and the thermoplastic elastomer may be a mixture of hydrogenated materials of two or more different styrenic thermoplastic elastomer such as SEPS and SEBS.

In case of SEPS, physical properties vary depending on the content of styrene, the molecular weight of isoprene and the molecular weight distribution. For example, it becomes harder as the styrene content increases, while the strength enhances as the molecular weight of isoprene becomes larger. As the molecular weight distribution becomes sharp, the moldability is lowered. Particularly, when the molecular weight of isoprene is large and the molecular weight distribution is sharp, it becomes difficult to form. Those having the styrene content of about 10 to 65% are generally known, but those having the styrene content of about 13 to 30%, preferably from about 13 to 20% are suited for use as SEPS in the present invention.

With respect to the moldability of the thermoplastic elastomer, MFR (Melt Flow Rate) under the conditions of a temperature of 230° C. and a load of 2.16 kg is 0.05 g/10 minutes or more, preferably 0.5 g/10 minutes or more, and more preferably 1 g/10 minutes or more. The reason is as follows. That is, the moldability is lowered by blending tungsten powder as compared with the case of using the thermoplastic elastomer alone.

The thermoplastic elastomer used in the present invention may be in the form of pellets or powders.

The styrenic thermoplastic elastomer can be prepared by a method of conducting living polymerization in the sequence of styrene-isoprene-styrene and styrene-butadiene-styrene using a monofunctional initiator such as alkyl lithium to prepare a block copolymer (three-stage polymerization using a monofunctional initiator) and hydrogenating the block copolymer, or by a method of conducting the living polymerization using the same initiator in the same manner, blocks using an alkyl halide to prepare a block copolymer (two-stage polymerization coupling method) and hydrogenating the block copolymer.

(Tungsten Powder)

Tungsten used in the present invention is preferably in the form of powders because it must be uniformly blended with a thermoplastic elastomer. The particle diameter is preferably 300 $\mu$m or less, more preferably 2 to 100 $\mu$m, still more preferably 3 to 30 $\mu$m, and particularly 3 to 27 $\mu$m. When the particle diameter of the tungsten powder becomes larger it becomes difficult for the thermoplastic resin composition to pass through a metal gate, thereby to lower the moldability in case of molding using an injection molding method. On the other hand, when the particle diameter becomes too small, the surface of the tungsten powder becomes larger, thereby making it impossible to completely coat the surface of the tungsten powder with the predetermined thermoplastic elastomer.

When using those having a small particle diameter in combination with those having a large particle diameter, the fluidity of the resin composition is improved and the moldability is improved, which is preferred. It is preferred to use those having a particle diameter of not more than 5 $\mu$m and those having a particle diameter of not less than 27 $\mu$m.

The tungsten powder used in the present invention is preferably subjected to a coupling treatment to enhance the affinity with the resin. The coupling agent includes, for example, titanate-, aluminum- and silane-based coupling agents. In the present invention, it is most preferred to use a silane-based coupling agent in view of the effect of enhancing the affinity with the resin.

(Thermoplastic Resin Composition)

The content of the thermoplastic elastomer in the thermoplastic resin composition used in the present invention is adjusted within a range from 2.5 to 8.0% by weight and the content of the tungsten powder is adjusted within a range from 97.5 to 92.0% by weight, respectively.

When the content of the thermoplastic elastomer is lower than the above range, the moldability and handling of the thermoplastic resin composition are lowered so that it becomes difficult to form a resin moiety. Even if the thermoplastic resin composition can be formed, the resulting balance weight is not likely to be fit to practical use because of poor moldability.

The lower limit of the content of the thermoplastic elastomer is preferably adjusted to 2.6% by weight, more preferably 2.8% by weight, within the above range to secure sufficient moldability (processability) and flexibility of the resin moiety. The upper limit of the content of the thermoplastic elastomer is preferably adjusted to 5.0% by weight, more preferably 4.5% by weight, within the above range to increase the content of the tungsten powder.

When the content of the tungsten powder is lower than the above range, it becomes impossible to enhance the specific gravity of the thermoplastic resin composition, thereby lowering the specific gravity of the balance weight itself. Therefore, there is a fear that the balance weight is not suited for practical use.

The lower limit of the content of the tungsten powder is preferably adjusted to 95.0% by weight, more preferably 95.5% by weight, within the above range to maintain the specific gravity of the thermoplastic resin composition at a higher value. The upper limit of the content of the tungsten powder is preferably adjusted to 97.4% by weight, more preferably 97.2% by weight, within the above range to secure the required minimum content of the thermoplastic resin composition.

The thermoplastic resin composition used in the present invention preferably has a surface hardness of 80 or less, more preferably 60 or less, the surface hardness being measured by the method defined in JIS (Japanese Industrial Standard) K 7215 (Testing machine, Type D).

The specific gravity of the thermoplastic resin composition is preferably 8 or higher to obtain sufficient specific gravity of the balance weight. The specific gravity is more preferably 9 or higher, and still more preferably 10 or higher.

To adjust the specific gravity of the thermoplastic resin composition to the value within the above range, the content of the tungsten powder is adjusted to 93.2% by weight or more (specific gravity: 8), 94.5% by weight or more (specific gravity: 9) or 95.5% by weight or more (specific gravity: 10) when using SEPS (styrene content: 13%) having a specific gravity of 0.89. When using SIBS (styrene content: 30%) having a specific gravity of 0.95, the content of the tungsten powder is adjusted to 92.7% by weight or more (specific gravity: 8), 94.1% by weight or more (specific gravity: 9) or 95.2% by weight or more (specific gravity: 10).

To impart the flexibility enough to easily bent by the hand to the thermoplastic resin composition, the content of the thermoplastic elastomer is adjusted to 3.0% by weight or more, and preferably 4.0% by weight or more.

To impart good processability to the thermoplastic resin composition thereby to improve the fluidity, a thermoplastic resin having the compatibility with the thermoplastic elastomer may be added.

When using SEPS as the thermoplastic resin, polypropylene (PP) having the compatibility with SEPS may be added. The amount of PP may be adjusted to about 5 to 35 parts by weight based on 100 parts by weight of SEPS.

If necessary, rubbers, antioxidants, thermal stabilizers, ultraviolet absorbers, antistatic agents, crystallization accelerators, coupling agents, aggregates, spreaders, pigments, dyes, softeners, antioxidants and crosslinking agents can be added to the thermoplastic resin composition as far as the content of the thermoplastic elastomer and tungsten powder are within the above range.

The crosslinking agent is used to optionally crosslink the thermoplastic elastomer, and serves to enhance bonding between the thermoplastic elastomers thereby to enhance the resistance to rubbing and breakage as compared with a non-crosslinked one. The crosslinking agent includes, for example, organic peroxides such as 2,5-dimethyl-2,5-t-butylperoxyl-hexyne-3, 2,5-dimethyl-2,5-di-t-butylperoxyhexane, di(t-butylperoxy)-m-diisopropylbenzene, di-t-butyl peroxide, dicumyl peroxide, t-butylcumyl peroxide and t-butyl peroxycumene.

(Method of Preparing Thermoplastic Resin Composition)

The method of preparing the thermoplastic resin composition is not specifically limited and, for example, there can be employed various conventionally known methods such as melt-kneading of the thermoplastic elastomer and tungsten powder using a single-screw or twin-screw extruder.

(Metal Clip)

The metal used in a clip 14 of a balance weight 10 according to the present invention is not specifically limited and examples thereof include carbon steel, stainless steel, tool steel and spring steel. Among these metals, those having excellent characteristics for spring are preferably used. Specifically, carbon tool steel is preferred.

The shape of a hook portion 11 of the metal clip 14 must be designed so that it can be firmly fixed to a flange edge portion 34 even in case where only the clip 14 was remained after removing a weight 12 from the balance weight 10 according to the present invention.

Figure 2B:
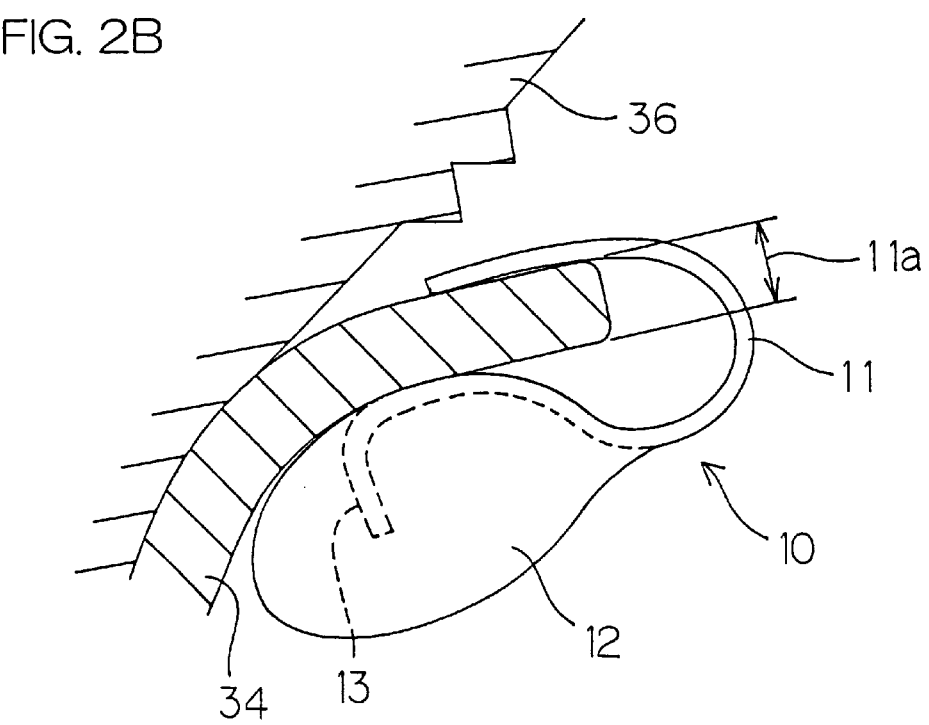
FIG. 2B is a partially enlarged view thereof.
Figure 3:
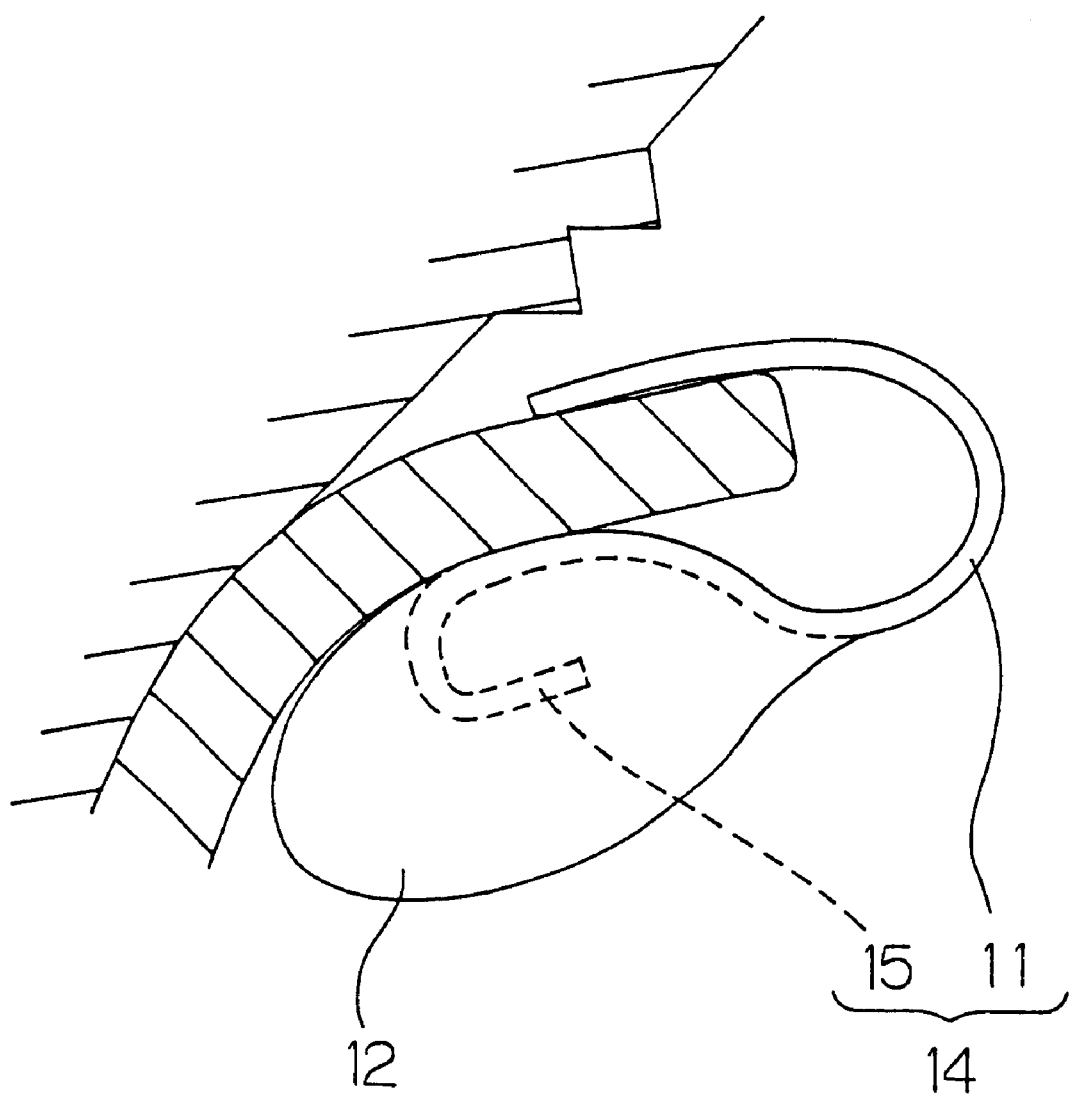
FIG. 3 is a sectional view showing another embodiment of the balance weight according to the present invention.
Figure 4:
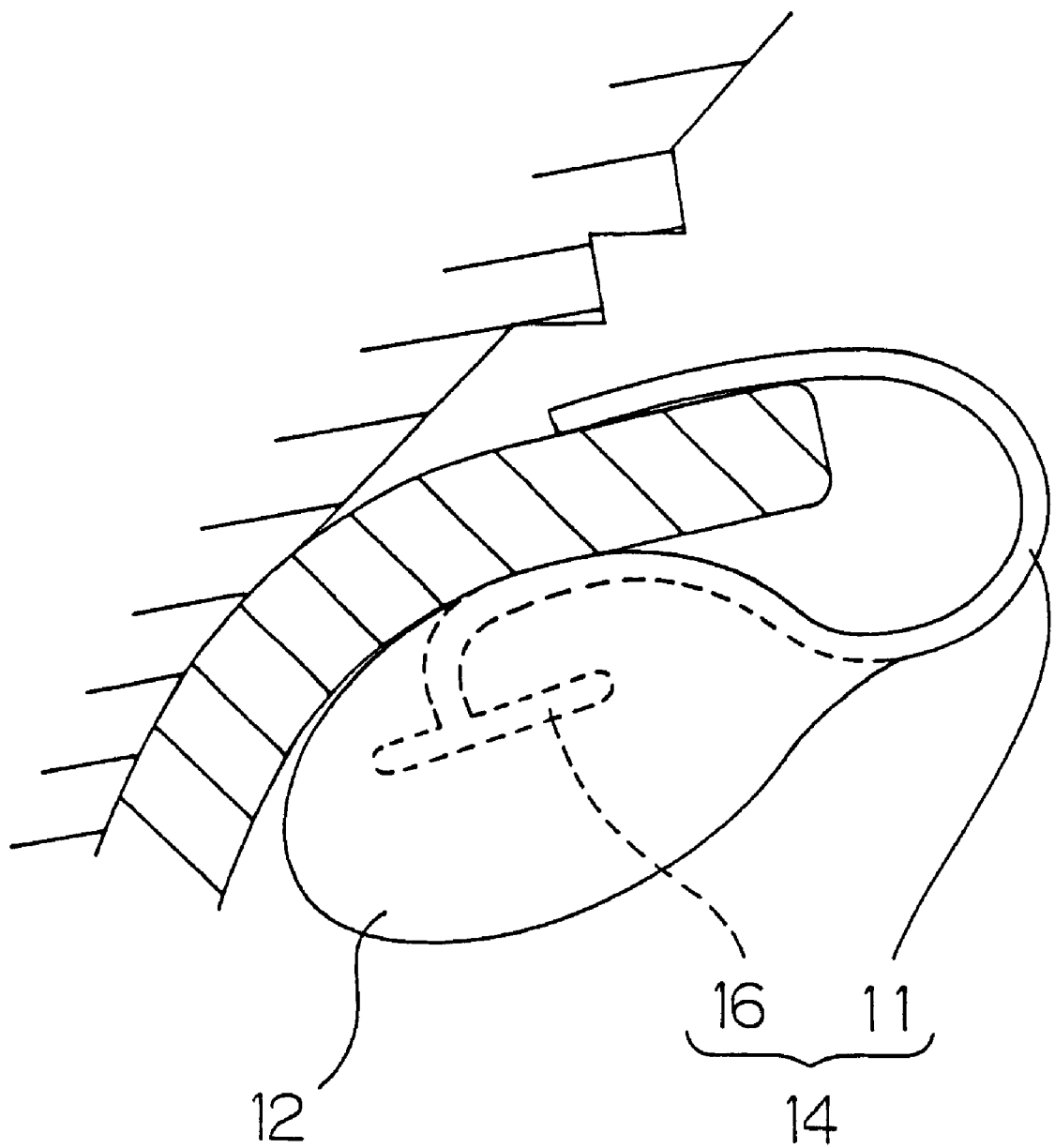
FIG. 4 is a sectional view showing still another embodiment of the balance weight according to the present invention.

As shown in FIG. 2B, FIG. 3 and FIG. 4, it is required to adjust the cross-sectional shape of the hook portion 11 of the metal clip 14 to the shape corresponding to the flange edge portion 34, and particularly to form the thickness 11a of the hook portion corresponding to the thickness of the flange edge portion 34.

The shape of a leg portion of the metal clip 14 is not specifically limited as far as it is capable of firmly fixing the weight 12. In addition to a leg portion 13 having the shape shown in FIG. 1B, various designs such as fish hook-shaped leg portion 15 shown in FIG. 3 and generally T-shaped leg portion 16 shown in FIG. 4 can be employed.

As shown in FIG. 1A, when the leg portion 13 is provided with a through hole 13a, the weight 12 can be fixed to the leg portion 13 more firmly.

(Shape of Balance Weight)

The balance weight 10 for vehicle wheel according to the present invention comprises a metal clip 14 and a weight 12 made of a resin composition having high specific gravity, as described above, the leg portion 13 of the metal clip 14 being provided with the weight 12.

It is necessary that the shape of the weight 12 to be attached to the leg portion 13 of the metal clip 14 is appropriately adjusted so that the weight 12 is not formed inside the hook portion 11 and the weight 12 is not contacted with the flange edge portion 34 when the balance weight 10 is attached to wheel of the vehicle tire.

Figure 5:
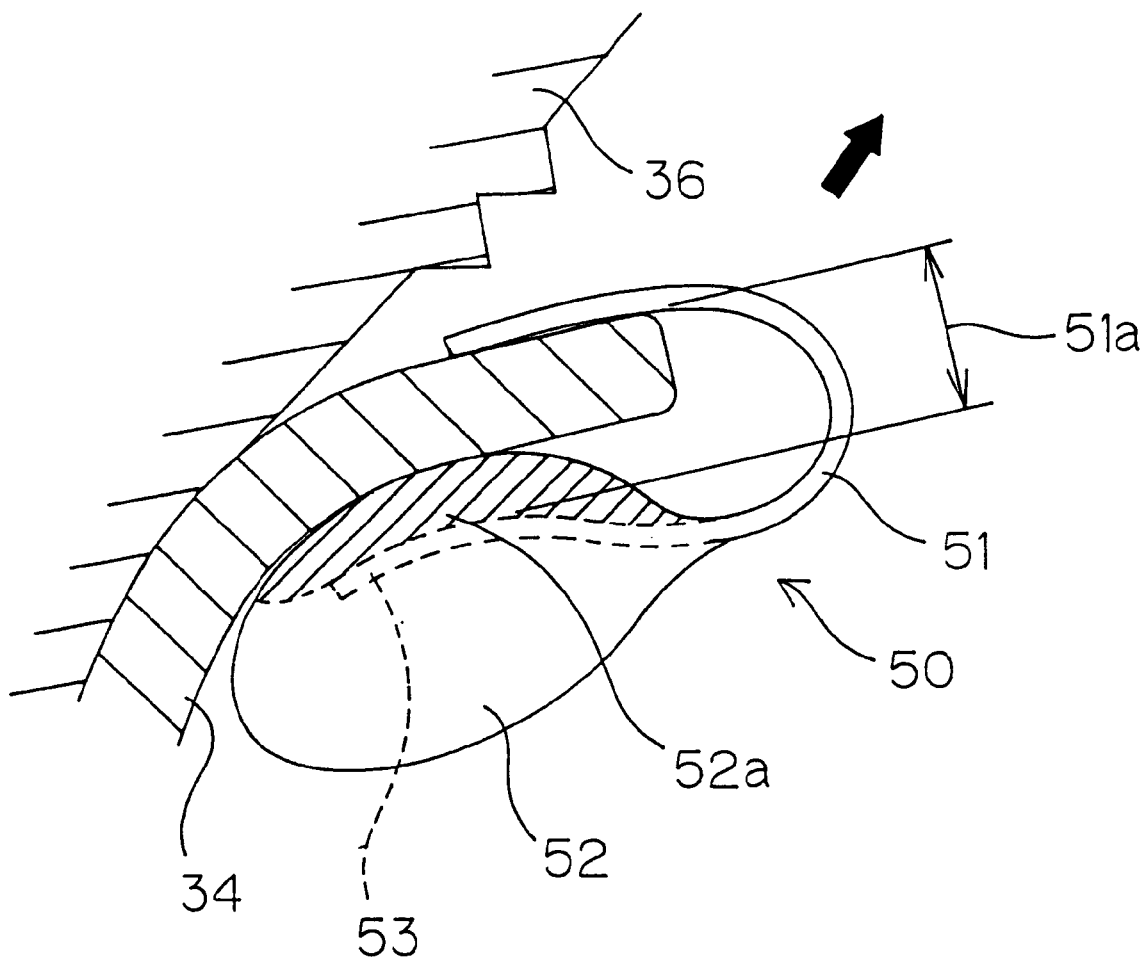
FIG. 5 is a sectional view showing the balance weight obtained in Comparative Example 1.

As shown in FIG. 5, a weight 52 made of a resin composition having high specific gravity surrounds the periphery of an edge portion 53 of a metal clip 50, thereby causing a problem that the weight 12 is scraped off by contact with the flange edge portion 34 on attachment to the flange edge portion 34 (the portion 52a, which is likely to be scraped off, is hatched) in the balance weight 50 wherein the weight 52 is formed inside the hook portion 51.

When the weight 52 is scraped off, a force of pressing the clip 50 against the wheel due to a centrifugal force produced by rotation of the wheel (shown by arrow in the drawing) is reduced and the clip lifts during the running. Finally, the clip is likely to come off from the wheel.

Accordingly, it is necessary that the balance weight has not such a shape that the distance 51a of the hook portion is larger than the thickness of the flange edge portion and the thickness of the weight 52 is adjusted to the thickness of the flange edge portion 34 (see FIG. 5), but a shape that the distance 11a of the hook portion 11 itself is adjusted to the thickness of the flange edge portion 34 and the metal clip 14 can be independently close-contacted and firmly fixed to the flange edge portion 34 (namely, it has such a shape that the clip 12 can be firmly fixed to the flange edge portion 34 of the wheel even in the state where the weight 12 is removed) like the balance weight 10 of the present invention shown in FIG. 1, FIG. 3 and FIG. 4, and that the weight 12 is not contacted with the flange edge portion 34.

With such a shape, when a centrifugal force is applied to the balance weight by rotation of the wheel, the weight 12 is pressed against the metal clip 14 thereby fixing the balance weight to the wheel more firmly and, at the same time, the weight 12 is not likely to be scraped off by pressing the weight 12 against the flange edge portion 34. After running for a long period, neither lifting, deviation nor come-off of the balance weight 10 does not occur and the wheel balance can be stably maintained.

(Method of Producing Balance Weight)

The method of producing a balance weight is not specifically limited and there can be employed various methods such as method of integrally molding a metal clip and a weight made of a resin composition having high specific gravity, and method of covering a previously produced metal clip with a resin composition having high specific gravity to form a weight portion. On molding, there can be used conventionally known various methods such as injection molding and compression molding.

EXAMPLES

The following Examples and Comparative Examples further illustrate the present invention.

As the thermoplastic elastomer in the Examples and Comparative Examples, a hydrogenated styrene-isoprene-styrene triblock copolymer manufactured by Kuraray Co., Ltd. (Japan) [trade name of "SEPTON 2063", SEPS having a styrene content of 13% by weight, specific gravity: 0.89, JIS A hardness: 36, number-average molecular weight: $1.56 \times 10^5$ and $4.08 \times 10^4$ (two peaks)] was used.

The tungsten powder used in the Examples and Comparative Examples was previously treated with a silane coupling agent. The treating procedure is as follows.

While stirring the tungsten powder using a mixing tank equipped with a high-speed stirring blade (super mixer), 0.3% by weight of a silane-based coupling agent [γ-(2-aminoethyl) aminopropyltrimethoxysilane, manufactured by Toray Dow Corning Silicone Co., Ltd. (Japan), under the trade name of "SH6020"] was added dropwise to the tungsten powder. The mixture was continuously stirred until the temperature in the tank became 120° C. and then cooled.

As the metal clip in the Examples and Comparative Examples, metal clips made of a carbon tool steel, each of which has the shape shown in FIG. 1B or FIG. 2B [manufactured by Yamate Kinzoku Co., Ltd. (Japan) under the trade name of "y2 30"] were used. The clip (y2 30) was introduced by insert molding on injection molding described hereinafter after cutting to reduce the width from 20 mm to 16.5 mm.

Example 1

(Production of Balance Weight)

A hydrogenated styrene-isoprene-styrene triblock copolymer (aforementioned "SEPTON 2063") and the tungsten powder treated previously with a silane-based coupling agent in a weight ratio of 3.0:97.0 (volume ratio of 40:60) were charged in a kneader, blended and then pelettized.

The pellets thus obtained and the above clip were integrally molded by using an injection molding machine [Model "SG25", manufactured by Sumitomo Heavy Industries, Ltd. (Japan)] to obtain a balance weight having a weight of 30 g, including the weight of the clip. On molding, the temperature of a cylinder was 250° C., the temperature of an injection nozzle [manufactured by SHI Plastic Machinery Co., Ltd. (Japan) under the trade name of "FTCII Nozzle"] was 240° C., and the surface temperature of a mold was from 135 to 140° C. The temperature of the mold was controlled by a temperature-controlled oil bath (170° C.).

The specific gravity of the resulting balance weight was 11.5. The distance 11a of the hook portion 11 of the metal clip 14 was 2 mm (see FIG. 2B) and nearly agreed with the thickness (about 2 mm) of the flange edge portion 34.

The balance weight was attached to the flange edge portion in a wheel having a diameter of 14 inch and a width of 5.5 inch. In that case, neither lifting nor deviation of the balance weight occurred.

(Actual Vehicle Running Durability Test I)

A wheel to which the balance weight of Example 1 was attached was mounted to an actual vehicle, and then a circuit running test at a speed of not less than 100 km/h and a test of repeating full braking were carried out. Furthermore, a durability running test up to 2000 km was carried out.

As a result, problems such as lifting and come-off of the balance weight did not occur in any test.

(Actual Vehicle Running Durability Test II)

The balance weight of Example 1 was attached to each of tires (wheel diameter: 14 inch) of a commercially available vehicle (sedan type, displacement: 1800 cc) and then an actual vehicle running test (3000 km) was carried out.

Two balance weights were respectively attached to both sides of front right wheel (FR), both sides of front left wheel (FL) and both sides of rear left wheel (RL), that is, total 12 positions.

The actual running includes running on a freeway in a proportion of 70% and was carried out for about three months from the first ten days of June to the last ten days of August.

The results of the actual vehicle running durability test II are shown in Table 1.

TABLE 1

| Lifting quantity (mm) of balance weight | | | |
|---|---|---|---|
| Position to be mounted | | After running 613 km | After running 3000 km |
| FR | Surface A | 0 | 0 |
|  | Surface B | 0 | 0 |
|  | Back surface A | 0.5 | 0.5 |
| FR | Back surface B | 0 | 0 |
|  | Surface A | 0.5 | 0.5 |
| FL | Surface B | 0.5 | 0.5 |
|  | Back surface A | 0 | 0.5 |
| FL | Back surface B | 0.5 | 0.5 |
| RL | Surface A | 0.5 | 0.5 |
|  | Surface B | 0.5 | 0.5 |
| RL | Back surface A | 0.5 | 0.5 |
|  | Back surface B | 0.5 | 0.5 |

As is apparent from Table 1, the balance weight of Example 1 did not come off during the running for a long period and the retention to the wheel was in a level enough to fit for general use.

As a result of the running test, a maximum space of 0.5 mm was formed between the flange edge of the wheel and the hook portion of the balance weight, however, an enlargement in the space caused by the running distance and the lapse of time was not observed.

As described above, the running test was carried out from rainy June to July and August wherein the quantity of sunshine is large and the temperature is high, that is, in the season whose weather conditions are comparatively severe. However, defects such as occurrence of cracks on the surface of the balance weight were not observed. This respect is also apparent from the results of the following accelerated weathering test.

Accelerated Weathering Test

After the wheel balance of Example 1 was subjected to the accelerated weathering test for 1000 hours (corresponding to exterior exposure for six years) using a Duke Cycle Sunshine Weatherometer WEL-SUN-DC (manufactured by Suga Test Instruments Co., Ltd., black panel temperature: 63° C., shower time: 12 minutes/60 minutes), the presence or absence of cracks on the surface of the weight portion and its degree were observed.

As a result of the accelerated weathering test, micro-cracks were observed on the surface of the weight portion of the balance weight, however, the micro-cracks could not be visually observed because they can be observed only by using an electron microscope. Therefore, it has been found that the weathering resistance can be put to practical use.

Comparative Example 1

In the same manner as in Example 1, except that the shape of the clip was changed to the shape shown in FIG. 5, a balance weight was produced.

The specific gravity of the entire balance weight thus obtained was 11.5. A distance 51a of a hook portion 51 was 5.4 mm (see FIG. 5) and a difference with the thickness (about 2 mm) was noticeable.

A wheel to which the balance weight of Comparative Example 1 was attached was mounted to an actual vehicle, and then the durability running II described above was carried out.

As a result, the resin at the back surface of the balance weight was scraped off by the flange edge portion 34 immediately after attaching the balance weight to the wheel. The metal clip lifted by the quantity of about 2 mm from the flange edge portion. After the durability running test (3000 km), the lifting quantity reaches about 3 to 4 mm, resulting in the state where the balance weight easily deviates or comes off in case of pulling by the hand. Therefore, fixation of the balance weight to the wheel was drastically poor.

Under the same conditions as those in the actual vehicle running durability test II described above, the running test (500 km) was carried out in February.

As a result, there arose no problem that the balance weight comes off from the rim during the running test. However, in spite of the running test of a comparatively small distance, the space between the metal fitting and the flange was large and the lifting quantity reached 3 to 4 mm after the durability running test, resulting in the state where the balance weight easily deviates or comes off in case of pulling by the hand. Therefore, fixation of the balance weight to the wheel was drastically poor.

As described above, according to the present invention, there can be obtained a balance weight having high specific gravity, flexibility and good moldability. This balance weight exhibited excellent fixation to the wheel and did not cause neither lifting nor deviation after endurance running and therefore, it could fit to practical use.

The disclosures of Japanese Patent Application Serial Nos.11-234419 and 2000-172293, filed on Aug. 20, 1999 and Jun. 8, 2000, respectively, are incorporated herein by reference.

What is claimed is:

1. A balance weight for a vehicle wheel, comprising:
a metal clip comprising a hook portion having a cross-sectional shape corresponding to a flange edge portion of the wheel, and a leg portion for retaining a weight, which is capable of independently close-contacting and fixing to flange edge portion, the weight made of a thermoplastic resin composition comprising 2.5 to 8.0% by weight of a styrenic thermoplastic elastomer and 97.5 to 92% by weight of tungsten powder and having a surface hardness of 80 or less, which is attached to the leg portion of the metal clip wherein the surface hardness of the thermoplastic resin composition is measured by the method defined in Japanese Industrial Standard K7215 (Type D).

2. The balance weight for a vehicle wheel according to claim 1, wherein the thermoplastic elastomer is a styrenic thermoplastic elastomer having a styrenic content of about 10 to 65% by molecular weight.

3. The balance weight for a vehicle wheel according to claim 1, wherein the styrenic thermoplastic elastomer is a polystyrene-poly(ethylene-butylene)-polystyrene(SEBS), a polystyrene-poly(ethylene-propylene)-polystyrene(SEPS) or a styrene-isobutylene-styrenetriblock copolymer(SIBS).

4. The balance weight for a vehicle wheel according to claim 1, wherein the specific gravity of the resin composition is 8 or higher.

5. The balance weight according to claim 1, wherein the metal clip is made of steel.

6. The balance weight for a vehicle wheel according to claim 1, wherein the moldability of the thermoplastic elastomer, MFR (melt flow rate) under the conditions of temperature of 230° C. and load of 2.16 Kg is 0.05 g/10 minutes or more.

7. The balance weight for a vehicle wheel according to claim 1, wherein the tungsten powder is a tungsten powder having a particle diameter of from not more than 5 $\mu$m to not less than 27 $\mu$m.

* * * * *